United States Patent
Cuni et al.

(10) Patent No.: US 8,259,587 B2
(45) Date of Patent: Sep. 4, 2012

(54) POOL-BASED NETWORK DIAGNOSTIC SYSTEMS AND METHODS

(76) Inventors: Genti Cuni, San Francisco, CA (US); Craig E. Foster, Santa Cruz, CA (US)

( * ) Notice: Subject to any disclaimer, the term of this patent is extended or adjusted under 35 U.S.C. 154(b) by 1215 days.

(21) Appl. No.: 11/627,903

(22) Filed: Jan. 26, 2007

(65) Prior Publication Data

US 2007/0121519 A1   May 31, 2007

Related U.S. Application Data (63) Continuation-in-part of application No. 11/560,247, filed on Nov. 15, 2006.

(60) Provisional application No. 60/739,878, filed on Nov. 23, 2005.

(51) Int. Cl.
H04J 1/16 (2006.01)

(52) U.S. Cl. ........ 370/241; 370/250

(58) Field of Classification Search ........ 370/241.1, 370/242, 244, 245, 248, 249, 250, 251, 252, 370/241, 397, 390; 709/223, 224, 226
See application file for complete search history.

(56) References Cited

U.S. PATENT DOCUMENTS

| | | | | |
|---|---|---|---|---|
| 5,388,189 A * | 2/1995 | Kung | ........ | 714/E11.157 |
| 6,006,016 A | 12/1999 | Faigon et al. | | |
| 6,085,243 A * | 7/2000 | Fletcher et al. | ........ | 709/224 |
| 6,088,497 A | 7/2000 | Phillips | | |
| 6,112,241 A * | 8/2000 | Abdelnour et al. | ........ | 370/218 |
| 6,253,339 B1 | 6/2001 | Tse et al. | | |
| 6,414,595 B1 | 7/2002 | Scrandis et al. | | |
| 6,598,033 B2 | 7/2003 | Ross et al. | | |
| 6,707,795 B1 | 3/2004 | Noorhosseini et al. | | |
| 6,785,286 B1 * | 8/2004 | O'Keeffe et al. | ........ | 370/397 |
| 6,801,940 B1 * | 10/2004 | Moran et al. | ........ | 709/224 |
| 7,480,840 B2 * | 1/2009 | Hathorn et al. | ........ | 714/724 |
| 2001/0034712 A1 * | 10/2001 | Colvin | ........ | 705/52 |
| 2009/0172474 A1 | 7/2009 | Negrete et al. | | |

FOREIGN PATENT DOCUMENTS

GB   2350530   11/2000

OTHER PUBLICATIONS

U.S. Appl. No. 11/560,247, filed Sep. 2, 2009, Office Action.
TW 095143217, Dec. 8, 2009, Office Action.
CN 200680043907.X, Nov. 20, 2009, Office Action.
CN 200680043907.X, May 12, 2010, Office Action.
EPO 109550160, Dec. 15, 2008, European Search Report.
EPO 109550160, Mar. 18, 2009, Exam Report.
PCT/US2006/061120, Oct. 16, 2007, International Search Report.
U.S. Appl. No. 11/560,247, filed Jun. 10, 2010, Office Action.
TW 095143217, Jul. 27, 2010, Office Action.

* cited by examiner

*Primary Examiner* — Anh-Vu Ly
*Assistant Examiner* — Gbemileke Onamuti
(74) *Attorney, Agent, or Firm* — Matthew A. Pequignot; Pequignot + Myers LLC (57) ABSTRACT

A networking system may include one or more nodes communicating with each other. The nodes may communicate via one or more links, which a switch or other structure may provide. The networking system may include one or more pools of at least one network diagnostic module. A network diagnostic module may test one or more links and may be configured to rove among a plurality of links. The networking system may include an alarm module.

20 Claims, 7 Drawing Sheets

POOL-BASED NETWORK DIAGNOSTIC SYSTEMS AND METHODS

CROSS-REFERENCE TO RELATED APPLICATIONS

This patent application is a Continuation-in-Part of U.S. patent application Ser. No. 11/560,247, filed Nov. 15, 2006, which claims priority to, and the benefit of, U.S. provisional patent application Ser. No. 60/739,878, filed Nov. 23, 2005, both of which are hereby incorporated by reference herein in their entirety.

BACKGROUND OF THE INVENTION

1. Field of the Invention

The present invention relates generally to networking systems. More particularly, embodiments of the invention relate generally to the testing of high speed data transmission systems and components.

2. Background Technology

Computer and data communications networks continue to proliferate due to declining costs, increasing performance of computer and networking equipment, and increasing demand for communication bandwidth. Communications networks— including wide area networks ("WANs"), local area networks ("LANs"), metropolitan area networks ("MANs"), and storage area networks ("SANs")—allow increased productivity and use of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has developed to the point that many different physical configurations presently exist. Examples include Gigabit Ethernet ("GE"), 10 GE, Fiber Distributed Data Interface ("FDDI"), Fibre Channel ("FC"), Synchronous Optical Network ("SONET") and InfiniBand networks. These networks, and others, typically conform to one of a variety of established standards, or protocols, which set forth rules that govern network access as well as communications between and among the network resources. Typically, such networks utilize different cabling systems, have different characteristic bandwidths and typically transmit data at different speeds. Network bandwidth, in particular, has been the driving consideration behind many advancements in the area of high speed communication systems, methods and devices.

For example, the ever-increasing demand for network bandwidth has resulted in the development of technology that increases the amount of data that can be pushed through a single channel on a network. Advancements in modulation techniques, coding algorithms and error correction have vastly increased the rates at which data can be transmitted across networks. For example, a few years ago, the highest rate that data could travel across a network was at about one Gigabit per second. This rate has increased to the point where data can travel across Ethernet and SONET networks at rates as high as 10 gigabits per second, or faster.

As communication networks have increased in size, speed and complexity however, they have become increasingly likely to develop a variety of problems that, in practice, have proven difficult to diagnose and resolve. Such problems are of particular concern in light of the continuing demand for high levels of network operational reliability and for increased network capacity.

The problems generally experienced in network communications can take a variety of forms and may occur as a result of a variety of different circumstances. Examples of circumstances, conditions and events that may give rise to network communication problems include the transmission of unnecessarily small frames of information, inefficient or incorrect routing of information, improper network configuration and superfluous network traffic, to name just a few. Such problems are aggravated by the fact that networks are continually changing and evolving due to growth, reconfiguration and introduction of new network topologies and protocols. Moreover, new network interconnection devices and software applications are constantly being introduced and implemented. Circumstances such as these highlight the need for effective, reliable, and flexible diagnostic mechanisms.

Figure 1:
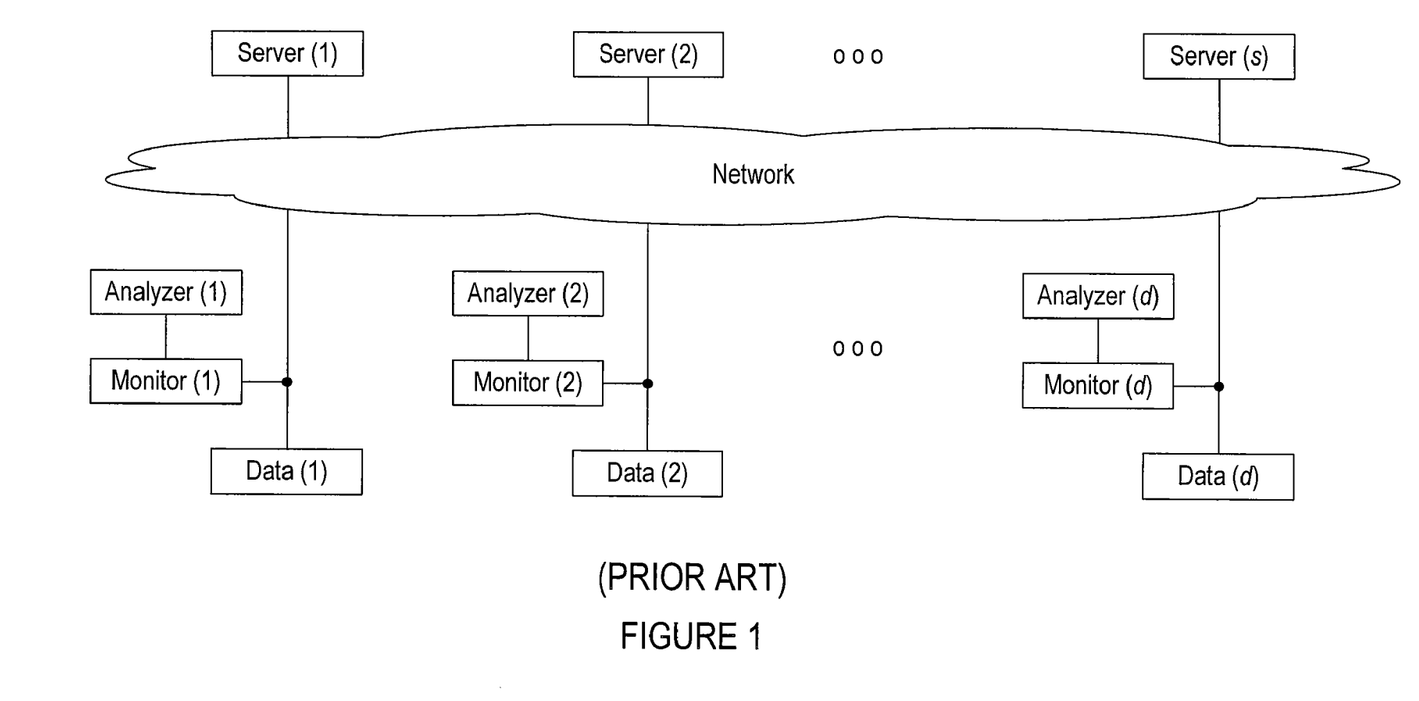
FIG. 1 is block diagram of one prior art configuration of a networking system.
Figure 2:
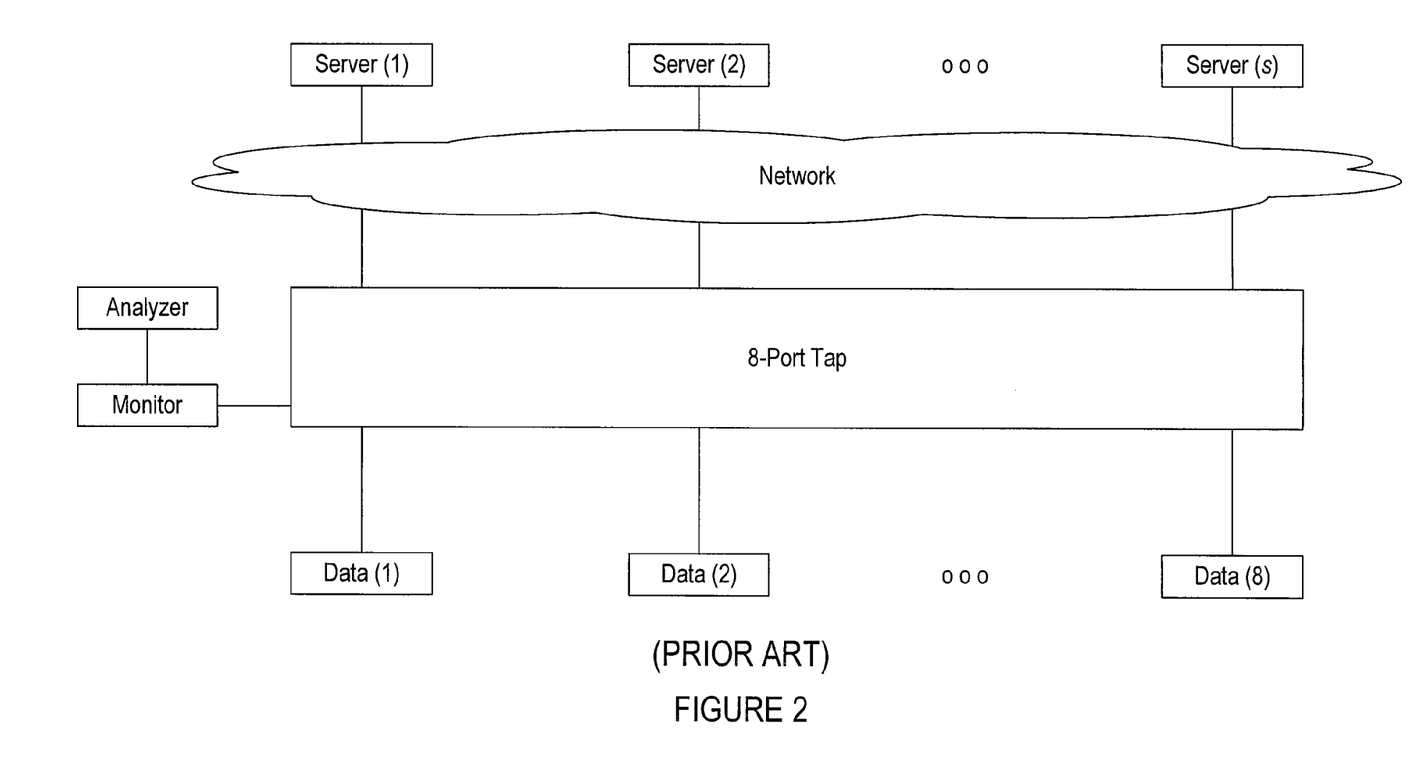
FIG. 2 is another is block diagram of one prior art configuration of a networking system.
Figure 3:
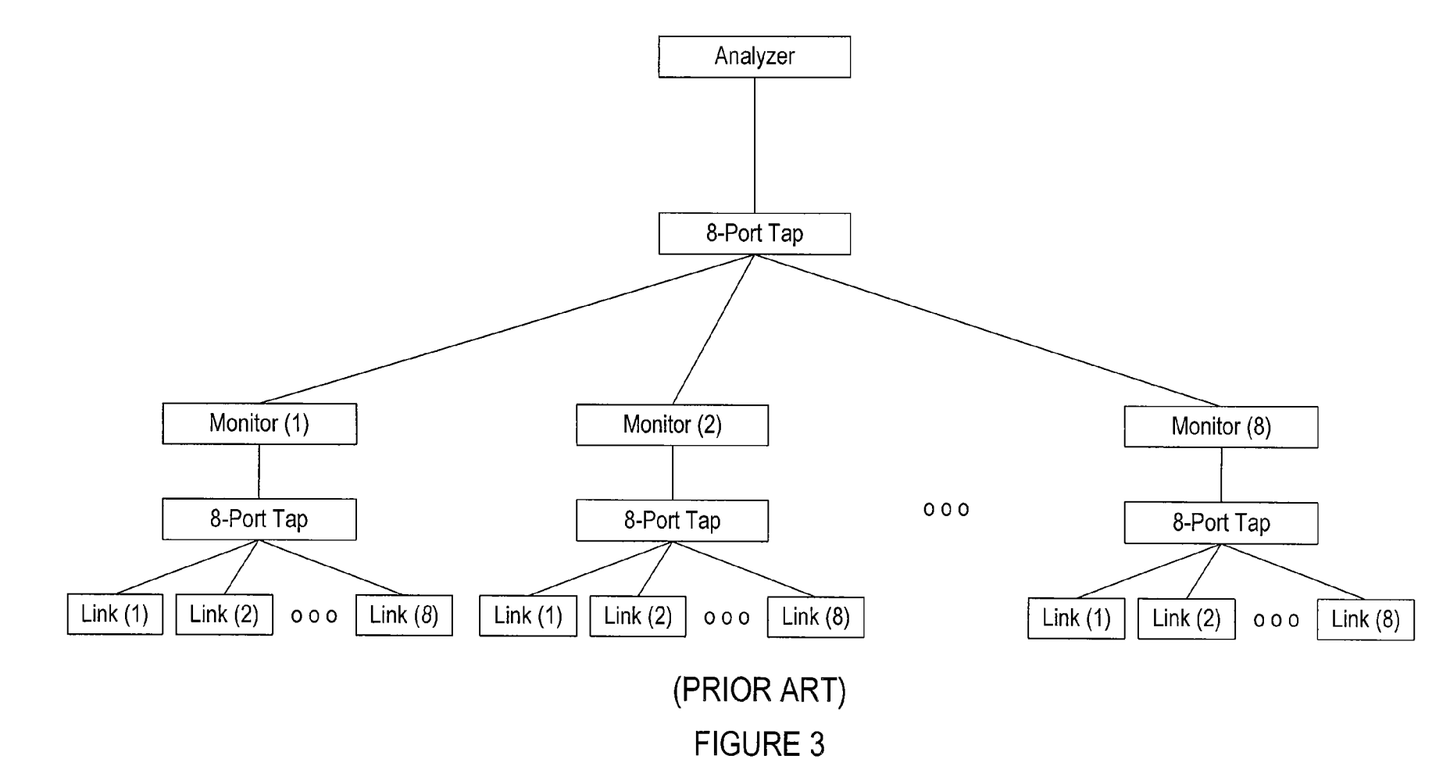
FIG. 3 is a yet another is block diagram of prior art configuration of a networking system.

As shown in FIGS. 1-3, certain prior art networking systems included one or more nodes (such as servers or data storage devices) communicating with each other. To test networking systems like these, protocol analyzers, monitors, and/or other network diagnostic modules were arranged in various configurations, such as the configurations shown in FIGS. 1-3. As shown in FIGS. 1-3, a link may be provided for each data source, and each data source may communicate via their respective links. Unfortunately, configurations like shown in FIGS. 1-3 could be expensive to purchase and time consuming to install.

For example, as shown in FIG. 1, to test communication to and from a data source, a monitor is coupled to the data storage device's link, and a protocol analyzer is coupled to the monitor. Thus, if there are d number of data storage devices (and d number of links to be tested), this configuration includes d number of monitors and d number of protocol analyzers.

While the configuration shown in FIG. 1 allows each link to be tested 100% of the time, monitors and protocol analyzers can be expensive—making the configuration shown in FIG. 1 impractical for many businesses, especially as the number of data storage devices increases. Accordingly, some businesses may choose to couple a monitor and/or a protocol analyzer to less than all of the links, allowing some of the links to be tested 100% of the time while other links are not tested at all. Unfortunately, testing less than all of the links may cause certain problems on the untested links to remain undiagnosed. Moreover, to test different links, the monitor and/or the protocol analyzer must be physically disconnected from their current link and reconnected to the new link—a time consuming process that can create wear and tear on the connection components.

As shown in FIG. 2, a tap may be used to allow a monitor and/or a protocol analyzer to be shared among a plurality of links. For example, an 8-port tap is coupled to eight links corresponding to eight data storage devices. A monitor is coupled to the tap, and a protocol analyzer is coupled to the monitor. To test communication to and from the data storage devices, the monitor may use the tap to "rove" from one link to another link. Testing only one link at a time via the tap, the monitor may rove among the links to allow any or all of the links to be tested (albeit for a percentage of the time). Thus, the configuration shown in FIG. 2 advantageously allows a monitor and/or a protocol analyzer to test any of 8 links.

Unfortunately, in the configuration shown in FIG. 2, the monitor may not rove away from a link while the protocol analyzer executes a bit capture on that link. Instead, the monitor disadvantageously waits until the protocol analyzer finishes the bit capture—meaning that the other links coupled to the monitor's tap are not monitored during the bit capture. Further, in the configuration shown in FIG. 2, while the protocol analyzer executes a bit capture on one link, the protocol analyzer may not execute another bit capture on another link—meaning that the bits on the other links coupled to the monitor's tap are not captured. Consequently, certain problems on these other links remain undiagnosed.

As shown in FIG. 3, a plurality of taps may be used to allow a protocol analyzer to be shared among a plurality of monitors with each monitor shared among a plurality of links. In particular, a protocol analyzer is coupled to a first 8-port tap. The first 8-port tap is coupled to eight monitors. Each monitor is coupled to an 8-port tap that is coupled to eight links corresponding to eight data storage devices. Accordingly, the configuration shown in FIG. 3 advantageously allows a protocol analyzer to test any of sixty-four links. Also, like the configuration shown in FIG. 2, the configuration shown in FIG. 3 advantageously allows an individual monitor to test any of eight links.

Unfortunately, in the configuration shown in FIG. 3, a monitor may not rove away from a link while the protocol analyzer executes a bit capture on that link. Instead, the monitor disadvantageously waits until the protocol analyzer finishes the bit capture—meaning that the other links coupled to the monitor's tap are not monitored during the bit capture. Further, in the configuration shown in FIG. 3, while the protocol analyzer executes a bit capture on one link, the protocol analyzer may not execute another bit capture on another link—meaning that the bits on the other links coupled to the monitor's tap (and the bits on the links coupled to the other monitors' taps) are not captured. Consequently, certain problems on these other links remain undiagnosed. In addition, the configuration shown in FIG. 3 may include several taps and related physical connections that can disadvantageously increase the overall cost of purchasing and installing the networking system.

In addition, using the 8-port taps, the configurations shown in FIGS. 2 and 3 may test up to 8 links and 64 links, respectively. Unfortunately, some businesses may have networking systems that include significantly more links than 64 links—meaning that businesses using the configuration shown in FIG. 2 or 3 must either purchase more and more protocol analyzers, taps and monitors (in order to repeat those configurations) or must allow only some of their links to be tested while other links are not tested at all.

SUMMARY

A need therefore exists for a networking system that eliminates or reduces the disadvantages and problems listed above and/or other disadvantages and problems.

One aspect of an embodiment of the invention is a networking system, which may include one or more nodes communicating with each other. The nodes may communicate using any suitable network protocols, including, but not limited to, serial protocols, physical layer protocols, channel protocols, packet-switching protocols, circuit-switching protocols, Ethernet, Fast Ethernet, Gigabit Ethernet, 10 Gigabit Ethernet, Fibre Channel, Fibre Channel Arbitrated Loop ("FC-AL"), Small Computer System Interface ("SCSI"), High Performance Parallel Interface ("HIPPI"), Serial Attached SCSI ("SAS"), Serial ATA ("SATA"), SAS/SATA, Serial SCSI Architecture ("SSA"), and the like. The networking system may comprise, for example, a network, a network diagnostic system, a network testing system, or the like.

Another aspect is a networking system that may include one or more network diagnostic modules, which may perform variety of network diagnostic functions. The diagnostic modules may be configured to function as a protocol analyzer, a monitor, and any other appropriate network diagnostic device, or any combination of one or more thereof.

Yet another aspect is a networking system that may include a switch via which a plurality of nodes may communicate. For example, the switch may include a plurality of ports; and the nodes may be coupled to the ports and may send and/or receive communication via the ports. The switch may link a plurality of ports to enable communication among the nodes connected to the ports, and the switch may unlink the ports to disable that communication. The switch may copy and send (or repeat) the communication among a plurality of ports to at least one other port. The switch preferably includes a software interface or other interface via which this linking, unlinking, and this copying may be configured and/or otherwise controlled by other software and/or hardware components. Thus, if desired, the switch may have software-programmable linking of ports, software-programmable unlinking or ports, and/or software-programmable copying (or repeating) of communication.

A further aspect is a networking system that may include a plurality of switches. The plurality of switches may function as a single switch, which may advantageously provide an increased number of ports. For example, in one embodiment, a plurality of switches may be interconnected and may be configured to function as a single switch when interconnected. Advantageously, these interconnected switches may function as an individual switch that includes an aggregate of the ports of each of the switches. It will be appreciated, however, that the plurality of switches need not be interconnected and may function independently, if desired.

Another aspect is a networking system that may include one or more pools (or sets) of one or more network diagnostic modules. The network diagnostic modules within a pool may perform the same or different network diagnostic functions.

A further aspect is a networking system that may include a switch and a pool of one or more network diagnostic modules. A member of the pool may be configured to test a set of one or more links of the switch. For example, one member of the pool may be configured to test single link, and another member of the pool may test a plurality of links. When testing a plurality of links, a member of the pool is preferably configured to move (or "rove") from one link to another link. Roving may advantageously allow the member to test each of a plurality of links—albeit for a percentage of the time. The member may be configured to rove from link to link at generally regular intervals to allow each link to be tested a generally equal amount of time; however, the member may be configured to rove from link to link at substantially different intervals to allow different links to be tested substantially different amounts of time depending, for example, upon the importance of the particular link. In addition, the members of pool may be allocated to test differently sized sets of links depending, for example, upon the importance of the particular links. For example, one member of the pool may be configured to rove among a relatively large set of less important links; and another member of the pool may be configured to rove among a relatively small set of more important links (or even test a single link). It will be appreciated, however, that the members of the pool may be configured to test the same sized sets of links, if desired.

Another further aspect is a networking system that may include a first pool of one or more network diagnostic modules and a second pool of one or more network diagnostic modules. One or more members of the second pool may be configured to test a link. For example, the one or more members of the second pool may—at least partially in response to a member of the first pool detecting particular conditions on a first link—be configured to test the first link. This condition-triggered configuration of the second pool may allow the one or more members of the second pool to troubleshoot the first link by performing additional network diagnostic functions. If desired, the member of the first pool may be configured to continue to rove from the first link to a second link without waiting for the one or more members of the second pool to finish troubleshooting the first link. Accordingly, because the member of the first pool may test the second link, one or more members of the second pool may—at least partially in response to the roving member detecting particular conditions on the second link—be configured to test the second link, even while troubleshooting continues on the first link, if desired. In one embodiment, because the second pool may have a limited number of members, the members of the second pool may be configured to test links according to priority.

Another aspect is a networking system that may include an alarm module, a first pool of one or more network diagnostic modules, and a second pool of one or more network diagnostic modules. The alarm module may configure one or more members of the second pool to test a link, which may advantageously allow these members of the second pool to troubleshoot the link by performing network diagnostic functions. Preferably, the alarm module may—at least partially in response to a member of the first pool detecting particular conditions on a link—configure one or more members of the second pool to test the link. In addition, the member of the first pool is preferably configured to rove from the link to another link without waiting for the troubleshooting to be finished. Further, because the second pool may have a limited number of members, the alarm module may configure one or more members of the second pool to test links according to priority.

For purposes of summarizing, some aspects, advantages and features of some embodiments of the invention have been described in this summary. Not necessarily all of (or any of) these summarized aspects, advantages or features will be embodied in any particular embodiment of the invention. Some of these summarized aspects, advantages and features and other aspects, advantages and features may become more fully apparent from the following detailed description and the appended claims.

BRIEF DESCRIPTION OF THE DRAWINGS

The appended drawings contain figures of preferred embodiments to further clarify the above and other aspects, advantages and features. It will be appreciated that these drawings depict only preferred embodiments of the invention and are not intended to limits its scope. These preferred embodiments will be described and explained with additional specificity and detail through the use of the accompanying drawings in which.

DETAILED DESCRIPTION

Certain embodiments relate generally to networking systems, including the testing of high speed data transmission systems and components. Embodiments of the invention may be used in other contexts unrelated to testing systems and components and/or in other contexts unrelated to high speed data transmission.

Exemplary Networking System

Figure 4:
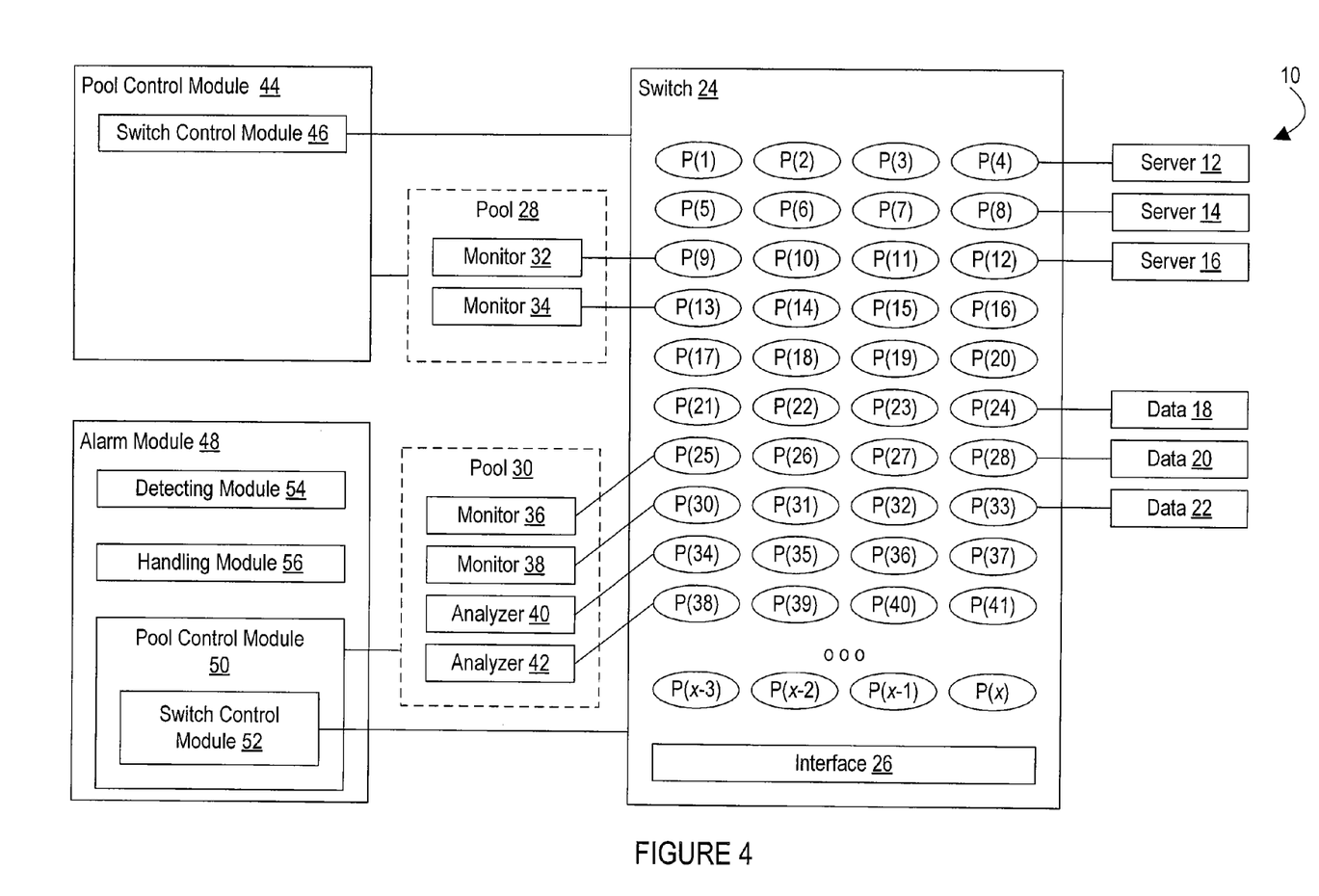
FIG. 4 is a block diagram of an exemplary embodiment of a networking system.

As shown in FIG. 4, a networking system 10 may include one or more nodes communicating with each other. As used herein, a "node" includes, but is not limited to, a server or host; a client or storage device; a switch; a hub; a router; all or a portion of a SAN fabric; a diagnostic device; and any device that may be coupled to a network and that may receive and/or monitor a signal or data over at least a portion of a network, that may send and/or generate a signal or data over at least a portion of a network, or both.

In one embodiment, a signal (such as, an electrical signal, an optical signal, and the like) may be used to send and/or receive network messages over at least a portion of a network. As used herein, a "network message" includes, but is not limited to, a packet; a datagram; a frame; a data frame; a command frame; an ordered set; any unit of data capable of being routed (or otherwise transmitted) through a computer network; and the like. In one embodiment, a network message may comprise transmission characters used for data purposes, protocol management purposes, code violation errors, and the like. Also, an ordered set may include, a Start of Frame ("SOF"), an End of Frame ("EOF"), an Idle, a Receiver_Ready ("R_RDY"), a Loop Initialization Primitive ("LIP"), an Arbitrate ("ARB"), an Open ("OPN"), and Close ("CLS")—such as, those used in certain embodiments of Fibre Channel. Of course, any ordered sets and/or any network messages of any other size, type, and/or configuration may be used, including, but not limited to, those from any other suitable protocols.

Nodes may communicate using suitable network protocols, including, but not limited to, serial protocols, physical layer protocols, channel protocols, packet-switching protocols, circuit-switching protocols, Ethernet, Fast Ethernet, Gigabit Ethernet, 10 Gigabit Ethernet, Fibre Channel, Fibre Channel Arbitrated Loop ("FC-AL"), Small Computer System Interface ("SCSI"), High Performance Parallel Interface ("HIPPI"), Serial Attached SCSI ("SAS"), Serial ATA ("SATA"), SAS/SATA, Serial SCSI Architecture ("SSA"), and the like.

Exemplar Network Diagnostic Modules

As shown in FIG. 1, the networking system 10 may comprise a network, a network diagnostic system, a network testing system, or the like; and the networking system 10 may include one or more network diagnostic modules, which may perform variety of network diagnostic functions. The diagnostic modules may be configured to function as any combination of: a protocol analyzer, a monitor, and any other appropriate network diagnostic device.

Protocol Analyzer

In some embodiments, a diagnostic module may function as a protocol analyzer (or network analyzer), which may be used to capture data or a bit sequence for further analysis. The analysis of the captured data may, for example, diagnose data transmission faults, data transmission errors, performance errors (known generally as problem conditions), and/or other conditions.

The protocol analyzer may be configured to receive a bit sequence via one or more communication paths or channels. Typically, the bit sequence comprises one or more network messages, such as, packets, frames, or other protocol adapted network messages. The protocol analyzer preferably passively receives the network messages via passive network connections.

The protocol analyzer may be configured to compare the received the bit sequence (or at least a portion thereof) with one or more bit sequences or patterns. Before performing this comparison, the protocol analyzer may optionally apply one or more bit masks to the received bit sequence. In performing this comparison, the protocol analyzer may determine whether all or a portion of the received bit sequence (or the bit masked version of the received bit sequence) matches and/or does not match the one or more bit patterns. In one embodiment, the bit patterns and/or the bit masks may be configured such that the bit patterns will (or will not) match with a received bit sequence that comprises a network message having particular characteristics—such as, for example, having an unusual network address, having a code violation or character error, having an unusual timestamp, having an incorrect CRC value, indicating a link re initialization, and/or having a variety of other characteristics.

The protocol analyzer may detect a network message having any specified characteristics, which specified characteristics may be user-selected via user input. It will be appreciated that a specified characteristic could be the presence of an attribute or the lack of an attribute. Also, it will be appreciated that the network analyzer may detect a network message having particular characteristics using any other suitable method.

In response to detecting a network message having a set of one or more characteristics, the network analyzer may execute a capture of a bit sequence—which bit sequence may comprise network messages and/or portions of network messages. For example, in one embodiment, when the network analyzer receives a new network message, the network analyzer may buffer, cache, or otherwise store a series of network messages in a circular buffer. Once the circular buffer is filled, the network analyzer may overwrite (or otherwise replace) the oldest network message in the buffer with the newly received network message or messages. When the network analyzer receives a new network message, the network may detect whether the network message has a set of one or more specified characteristics. In response to detecting that the received network message has the one or more specified characteristics, the network analyzer may execute a capture (1) by ceasing to overwrite the buffer (thus capturing one or more network messages prior to detected message), (2) by overwriting at least a portion or percentage of the buffer with one or more newly received messages (thus capturing at least one network message prior to the detected message and at least network one message after the detected message), or (3) by overwriting the entire buffer (thus capturing one or more network messages after the detected message). In one embodiment, a user may specify via user input a percentage of the buffer to store messages before the detected message, a percentage of the buffer to store messages after the detected message, or both. In one embodiment, a protocol analyzer may convert a captured bit stream into another format.

In response to detecting a network message having a set of one or more characteristics, a network analyzer may generate a trigger adapted to initiate a capture of a bit sequence. Also, in response to receiving a trigger adapted to initiate a capture of a bit sequence, a network analyzer may execute a capture of a bit sequence. For example, the network analyzer may be configured to send and/or receive a trigger signal among a plurality of network analyzers. In response to detecting that a received network message has the one or more specified characteristics, a network analyzer may execute a capture and/or send trigger signal to one or more network analyzers that are configured to execute a capture in response to receiving such a trigger signal. Further embodiments illustrating trigger signals and other capture systems are described in U.S. patent application Ser. No. 10/881,620 filed Jun. 30, 2004 and entitled PROPAGATION OF SIGNALS BETWEEN DEVICES FOR TRIGGERING CAPTURE OF NETWORK DATA, which is hereby incorporated by reference herein in its entirety. Also, for example, a monitor (discussed in detail below) may be configured to generate a trigger adapted to initiate a capture of a bit sequence and may send that trigger to one or more network analyzers.

It will be appreciated that a capture may be triggered in response to detecting any particular circumstance—whether matching a bit sequence and bit pattern, receiving an external trigger signal, detecting a state (such as, when a protocol analyzer's buffer is filled), detecting an event, detecting a multi-network message event, detecting the absence of an event, detecting user input, or any other suitable circumstance.

The protocol analyzer may optionally be configured to filter network messages (for example, network messages having or lacking particular characteristics), such as, messages from a particular node, messages to a particular node, messages between or among a plurality of particular nodes, network messages of a particular format or type, messages having a particular type of error, and the like. Accordingly, using one or more bit masks, bit patterns, and the like, the protocol analyzer may be used identify network messages having particular characteristics and determine whether to store or to discard those network messages based at least in part upon those particular characteristics.

The protocol analyzer may optionally be configured to capture a portion of a network message. For example, the protocol analyzer may be configured to store at least a portion of a header portion of a network message, but discard at least a portion of a data payload. Thus, the protocol analyzer may be configured to capture and to discard any suitable portions of a network message.

It will be appreciated that a particular protocol specification may require network messages to have particular characteristics. Thus, a manufacturer of network nodes and the like may use the protocol analyzer to determine whether their goods comply with a protocol. Also, when nodes are deployed, the protocol analyzer may be used to identify defects in a deployed node or in other portions of a deployed network.

Monitor

In some embodiments, a diagnostic module may function as a monitor, which may be used to derive statistics from one or more network messages having particular characteristics, one or more conversations having particular characteristics, and the like.

As described below, the monitor may be configured to receive a bit sequence via one or more communication paths or channels. Preferably, the monitor passively receives the network messages via one or more passive network connections.

To determine the network messages and/or the conversations from which statistics should be derived, the monitor may be configured to compare a received a bit sequence—such as a network message—(or a portion of the received bit sequence) with one or more bit sequences or patterns. Before performing this comparison, the monitor may optionally apply one or more bit masks to the received bit sequence. In performing this comparison, the monitor may determine whether all or a portion of the received bit sequence (or the bit masked version of the received bit sequence) matches and/or does not match the one or more bit patterns. In one embodiment, the bit patterns and/or the bit masks may be configured such that the bit patterns will (or will not) match with a received bit sequence (or portion thereof) when the received bit sequence comprises a network message from a particular node, a network message to a particular node, a network message between or among a plurality of particular nodes, a network message of a particular format or type, a network message having a particular error, and the like. Accordingly, the monitor may be configured to detect a network message having any specified characteristics—including but not limited to whether the network message is associated with a particular conversation among nodes.

Upon detecting a network message having specified characteristics, the monitor may create and update table entries to maintain statistics for individual network messages and/or for conversations comprising packets between nodes. For example, a monitor may count the number of physical errors (such as, bit transmission errors, CRC error, and the like), protocol errors (such as, timeouts, missing network messages, retries, out of orders), other error conditions, protocol events (such as, an abort, a buffer is full message), and the like. Also, as an example, the monitor may create conversation specific statistics, such as, the number of packets exchanged in a conversation, the response times associated with the packets exchanged in a conversation, transaction latency, block transfer size, transfer completion status, aggregate throughput, and the like. It will be appreciated that a specified characteristic could be the presence of an attribute or the lack of an attribute.

In some embodiments, the diagnostic module may include any features and/or perform any method described in U.S. patent application Ser. No. 10/769,202, entitled MULTI-PURPOSE NETWORK DIAGNOSTIC MODULES and filed on Jan. 30, 2004, which is hereby incorporated by reference herein in its entirety.

Exemplary Switch & Nodes

As shown in FIG. 4, the networking system 10 may include a switch via which the nodes may communicate. In particular, as shown in FIG. 4, a switch 24 preferably includes a plurality of ports, such as ports P(1) to P(x), via which nodes may send and/or receive communication, such as network messages. One or more servers 12, 14 and 16; one or more data storage devices 18, 20 and 22; and/or one or more other nodes may be coupled to the ports of the switch 24.

The switch 24 may link a plurality of ports to enable communication among the nodes connected to the ports, and the switch 24 may unlink the ports to disable that communication. The switch 24 may copy and send (or repeat) the communication among a plurality of ports to at least one other port. The switch 24 preferably includes a software interface or other interface 26 via which this linking, unlinking, and this copying may be configured and/or otherwise controlled by other software and/or hardware components. Thus, if desired, the switch 24 may have software-programmable linking of ports, software-programmable unlinking or ports, and/or software-programmable copying (or repeating) of communication.

In one embodiment, the switch 24 may comprise a physical layer switch. It will be appreciated, however, that the switch 24 may comprise other types of switches.

In one embodiment, a plurality of switches 24 may function as a single switch 24—which may advantageously provide an increased number of ports. For example, a plurality of switches 24 may be interconnected and may be configured to function as a single switch 24 when interconnected. Advantageously, these interconnected switches may function as an individual switch that includes an aggregate of the ports of each of the switches. It will be appreciated, however, that the plurality of switches 24 need not be interconnected and may function independently, if desired.

One exemplary switch that may be used to implement the switch 24 is the UltraNet Connectivity System (UCS) 2900 physical layer switch, which is commercially available from McData corporation having corporate offices at 380 Interlocken Crescent, Broomfield, Colo. 80021, USA. The UCS 2900 switch may include from 32 to over 4000 ports. Another exemplary switch that may be used to implement the switch 24 is the INTELLAPATCH™ physical layer switch, which commercially available from Apcon, Inc. having corporate offices at 17938 SW Upper Boones Ferry Road, Portland, Oreg. 97224, USA. The INTELLAPATCH™ switch may include at least 16, 32, 64, 144 and 288 ports.

Thus, some embodiments of the switch 24 may include up to over 4000 ports. However, it will be appreciated, however, that other suitable switches may be used to implement the switch 24 and that the switch 24 may have more or fewer ports.

Exemplary Pools of Network Diagnostic Modules

As shown in FIG. 4, the networking system 10 may include one or more pools (or sets), such as pools 28 and 30; and a pool (or a set) may include one or more network diagnostic modules. Thus, a pool (or a set) may consist of a single network diagnostic module; however, a pool (or a set) may include any number of network diagnostic modules. The network diagnostic modules within a pool (or a set) may perform the same or different network diagnostic functions.

Exemplary Roving Pool

As shown in FIG. 4, the networking system 10 preferably includes a first pool 28 including at least one monitor. As illustrated in FIG. 4, the pool 28 includes the monitors 32, 34; however, the pool 28 may have any other suitable number of monitors, analyzers and/or other network diagnostic devices depending, for example, upon the particular configuration of the networking system. A member of the pool 28 may be configured to test a set of one or more links of the switch 24. For example, one member of the pool 28 may be configured to test single link, and another member of the pool 28 may test a plurality of links.

When testing a plurality of links, a member of the pool 28 is preferably configured to move (or "rove") from one link to another link. Roving advantageously allows the member to test each of a plurality of links—albeit for a percentage of the time. The member may be configured to rove from link to link at generally regular intervals to allow each link to be tested a generally equal amount of time; however, the member may be configured to rove from link to link at substantially different intervals to allow different links to be tested substantially different amounts of time depending, for example, upon the importance of the particular link.

In addition, the members of pool 28 may be allocated to test differently sized sets of links depending, for example, upon the importance of the particular links. For example, one member of the pool 28 may be configured to test a relatively large set of less important links; and another member of the pool 28 may be configured to test a relatively small set of more important links (or even a single, important link). It will be appreciated, however, that the members of the pool 28 may be configured to test the same sized sets of links, if desired.

Exemplary Troubleshooting Pool

In addition, the networking system 10 preferably includes a second pool 30 including at least one monitor and/or at least one protocol analyzer. As illustrated in FIG. 4, the pool 30 includes the monitors 36, 38 and the analyzers 40, 42; however, the pool 30 may have any other suitable number of monitors, analyzers and/or other network diagnostic devices depending, for example, upon the particular configuration of the networking system.

In one embodiment, discussed in further detail below, one or more members of the pool 30 may be configured to test a link. In particular, the one or more members of the pool 30 may—at least partially in response to a roving member of the pool 28 detecting a particular conditions on the link—be configured to test the link. This condition-triggered configuration may allow the one or more members of the pool 30 to troubleshoot the link by performing additional network diagnostic functions (such as executing a bit capture, monitoring, or the like). Advantageously, the roving member of the pool 28 may continue to rove from this first link to a second link without waiting for the one or more members of the pool 30 to finish troubleshooting the first link. Accordingly, because the roving member of the pool 28 may test the second link, one or more members of the pool 30 may—at least partially in response to the roving member detecting particular conditions on the second link—be configured to test the second link, even while troubleshooting continues on the first link. In a further embodiment, discussed in further below, because the pool 30 may have a limited number of members, the members of the pool 30 may be configured to test links according to priority.

It will be appreciated, however, that the roving member of the pool 28 may be configured to wait for particular troubleshooting to be finished before roving, if desired.

Exemplary Control of Pools

The networking system may include one or more pool control modules, which may be configured to at least partially control the diagnostic functions performed by the members of the pool. For example, to allow a diagnostic module to perform a diagnostic function using a first link of the switch, a pool control module may direct the switch 24 to commence copying (to the port to which the diagnostic module is connected) the communication occurring via the first link. Also, for example, to allow the diagnostic module to perform a diagnostic function using a second link of the switch 24, a pool control module may direct the switch 24 to cease copying (to the port to which the diagnostic module is connected) the communication occurring via the first link and to commence copying (to the port to which the diagnostic module is connected) the communication occurring via the second link.

Exemplary "Roving" Pool Control

In greater detail, as shown in FIG. 4, a pool control module 44 may at least partially control the diagnostic functions performed by the members of the pool 28. For example, the pool control module 44 preferably includes a switch control module 46 that may communicate via the interface 26 of the switch 24 to at least partially control the data upon which the members of the pool 28 may perform diagnostic functions.

In particular, by communicating via the interface 26, the switch control module 46 may direct the switch 24 to commence copying (to the ports to which the monitors 32, 34 are connected) the communication occurring via a plurality of linked ports. Accordingly, the monitors 32, 34 may passively receive and test that copied communication. For example, if the switch 24 has linked the server 12 and the storage device 22 via ports P(4) and P(33), the switch control module 46 may direct the switch 24 to copy the communication between the ports P(4) and P(33) to the port P(9) to allow the monitor 32 to perform one or more network diagnostic functions using that copied communication.

In addition, by communicating via the interface 26, the switch control module 46 may direct the switch 24 to cease copying communication to the ports that the monitors 32, 34 are connected to. For example, after directing the switch 24 to commence copying communication to the ports that the monitors 32, 34 are connected to, the switch control module 46 may direct the switch 24 to cease copying communication to those ports.

Consequently, by communicating via the interface 26, the switch control module 46 may direct the switch 24 to commence and/or cease copying communication to the ports that the monitors 32, 34 are connected to—allowing the monitors 32, 34 to "rove" among various links. For example, if the switch 24 has linked the server 14 and the storage device 18 via ports P(8) and P(24), the switch control module 46 may first direct the switch 24 to copy the communication between the ports P(8) and P(24) to the port P(13) to allow the monitor 34 to perform one or more network diagnostic functions using that copied communication. Afterwards, the switch control module 46 may direct the switch 24 to cease copying the communication between the ports P(8) and P(24) to the port P(13). Later, if the switch 24 has linked the server 16 and the storage device 20 via ports P(12) and P(28), the switch control module 46 may direct the switch 24 to copy the communication between the ports P(12) and P(28) to the port P(13) to allow the monitor 34 to perform one or more network diagnostic functions using that copied communication.

In some embodiments, a roving enablement scheme may be implemented by control module 44. In such embodiments, a user may be prompted to enter an authorization key such as a license key provided by the manufacture of control module 44. The control module may then be configured to ascertain if the entered authorization key is proper. If it is proper, then the roving enablement scheme may continue. If the authorization key is not proper, a user interface may inform the user to obtain a valid authorization key. Supposing the key is correct, the control module may then be configured to obtain identification data such as a serial number for switch 24. This identification data may then be checked to verify that it is within a predetermined range specified by the control module 44 manufacturer. If the identification data is within the predetermined range, then the roving capability will be enabled and the user may rove as previously described. If the identification data is not within the predetermined range, then a user interface component may inform the user to contact the manufacturer of control module 44 for further information. Such an enablement scheme advantageously protects against the use of a switch(s) 24 that are not properly configured for roving.

Exemplary Troubleshooting Pool Control

Likewise, an alarm module 48 (discussed in further detail below) may include a pool control module 50, which may at least partially control the diagnostic functions performed by the members of the pool 30. The pool control module 50 preferably includes a switch control module 52 that may communicate via the interface 26 of the switch 24 to at least partially control the data upon which the members of the pool 30 may perform diagnostic functions.

In particular, by communicating via the interface 26, the switch control module 52 may direct the switch 24 to commence copying (to the ports to which the monitors 36, 38 and the protocol analyzers 40, 42 are connected) the communication occurring via a plurality of linked ports. Accordingly, the monitors 36, 38 and the protocol analyzers 40, 42 may passively receive and test that copied communication. For example, if switch 24 has linked the server 12 and the storage device 22 via ports P(4) and P(33), the switch control module 52 may direct the switch 24 to copy the communication between the ports P(4) and P(33) to the port P(34) to allow the protocol analyzer 40 to perform one or more network diagnostic functions using that copied communication.

In addition, by communicating via the interface 26, the switch control module 52 may direct the switch 24 to cease copying communication to the ports that the monitors 36, 38 and the protocol analyzers 40, 42 are connected to. For example, after directing the switch 24 to commence copying communication to the ports the monitors 36, 38 and the protocol analyzers 40, 42 are connected to, the switch control module 52 may direct the switch 24 to cease copying communication to those ports.

Consequently, by communicating via the interface 26, the switch control module 52 may direct the switch 24 to commence and/or cease copying communication to the ports that the monitors 36, 38 and the protocol analyzers 40, 42 are connected to—allowing the monitors 36, 38 and/or the protocol analyzers 40, 42 to perform network diagnostic functions among various links. For example, if the switch 24 has linked the server 14 and the storage device 18 via ports P(8) and P(24), the switch control module 52 may first direct the switch 24 to copy the communication between the ports P(8) and P(24) to the port P(38) to allow the protocol analyzer 42 to perform one or more network diagnostic functions using that copied communication. Afterwards, the switch control module 52 may direct the switch 24 to cease copying the communication between the ports P(8) and P(24) to the port P(38). Later, if switch 24 has linked the server 16 and the storage device 20 via ports P(12) and P(28), the switch control module 52 may direct the switch 24 to copy the communication between the ports P(12) and P(28) to the port P(38) to allow the protocol analyzer 42 to perform one or more network diagnostic functions using that copied communication.

Exemplary Alarm Module and Methods

As discussed in further detail below, the alarm module 48 may configure one or more members of the pool 30 to test a link, which may advantageously allow these members of the pool 30 to troubleshoot the link by performing additional network diagnostic functions (such as executing a bit capture, monitoring, or the like). Preferably, the alarm module 48 may—at least partially in response to a member of the pool 28 detecting particular conditions on a link—configure one or more members of the pool 30 to test the link. In addition, the member of the pool 28 is preferably configured to rove from the link to another link without waiting for the troubleshooting to be finished. Further, because the pool 30 may have a limited number of members, the alarm module 48 may configure one or more members of the pool 30 to test links according priority.

Figure 5:
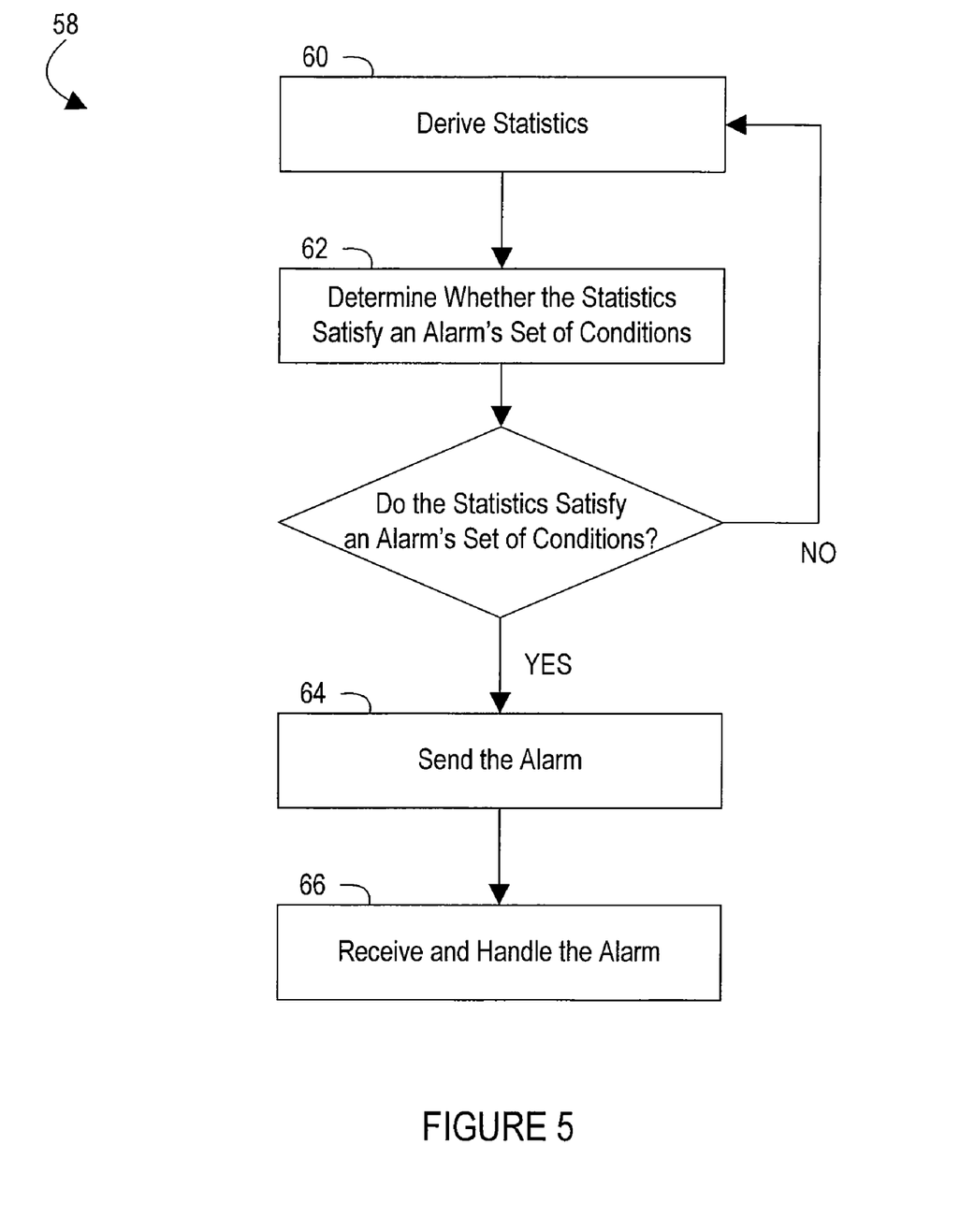
FIG. 5 is flow chart of an exemplary method.

In greater detail, as shown in FIG. 4, the alarm module 48 may include a detecting module 54, a handling module 56, and the pool control module 50. As shown in FIGS. 4 and 5, the alarm module 48 and one or more members of the pool 28 may perform some or all of a method 58; however, some or all of the method 58 may be performed by the alarm module 48; one or more members of the pool 28; one or more other suitable modules, systems, and the like; or any suitable combination of one or more thereof. Of course, the entire method 58 need not be performed; and any part or parts of the method 58 may be performed to provide a useful method 58.

As shown in FIG. 5, at a block 60, a monitor in the pool 28, such as the monitor 32, may derive statistics from communication that the switch 24 copies to the port to which the monitor is connected. The monitor 32 may, for example, derive the statistics using one or more network messages having particular characteristics, one or more conversations having particular characteristics, and the like.

As shown in FIG. 5, the detecting module 54 may receive the statistics from the monitor 32; and at a block 62, the detecting module 54 may determine whether the statistics satisfy an alarm's set of one or more conditions. The set of conditions associated with an alarm is preferably user-specified, and the conditions preferably indicate situations in which troubleshooting may be helpful. In one embodiment, the set of alarm conditions associated with a particular alarm may be user-specified via, for example, a software interface or other interface.

As shown in FIG. 5, if, at the block 62, the statistics do not satisfy any alarm's set of conditions, the method 58 may proceed back to the block 60. If, at the block 62, the statistics do satisfy an alarm's set of conditions, the detecting module 54 may, at a block 64, send the alarm to the handling module 56.

At a block 66, the handling module 56 may receive the alarm and may handle it appropriately. For example, the handling module 56 may send out one or more email messages, update a log file, and/or take other suitable actions. In one embodiment, at the block 66, the handling module 56 may direct the pool control module 50 to perform a method 68, shown in FIG. 6.

Figure 6:
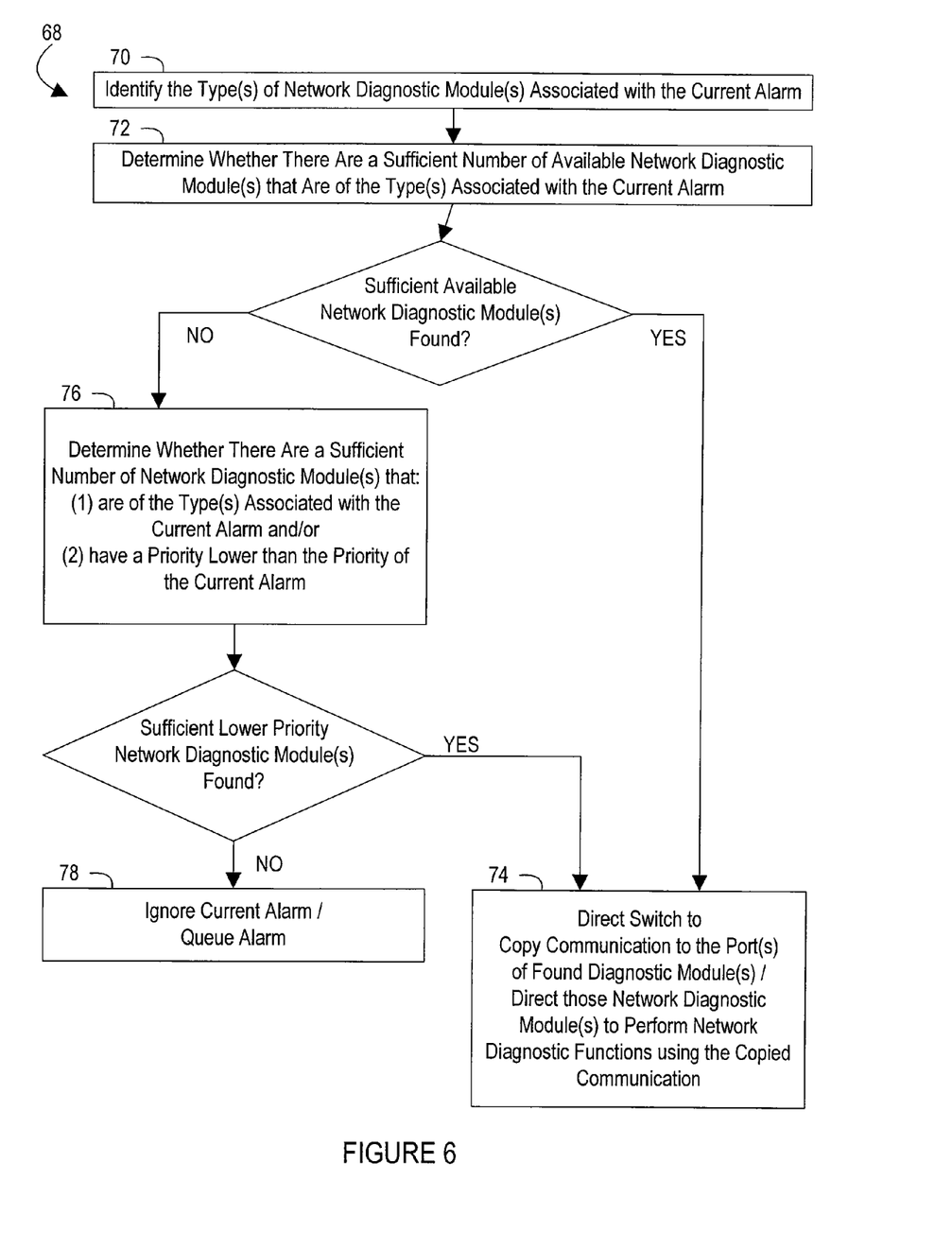
FIG. 6 is flow chart of an exemplary method.

As shown in FIG. 6, the pool control module 50 may perform some or all of a method 68; however, some or all of the method 68 may be performed by the pool control module 50; one or more other suitable modules, systems, and the like; or any suitable combination of one or more thereof. Of course, the entire method 68 need not be performed; and any part or parts of the method 68 may be performed to provide a useful method 68.

As shown in FIG. 6, at a block 70, the pool control module 50 may identify one or more types of network diagnostic modules associated with a current alarm. For example, in response to the alarm being detected, it may be desirable to have one or more network diagnostic modules of particular types (such as a monitor, a protocol analyzer, or both) perform one or more network diagnostic functions (such as executing a bit capture, monitoring, or the like) using a link of the switch 24. In one specific example, in response to the alarm being detected, it may be desirable for a protocol analyzer to execute a bit capture. In another specific example, in response to the alarm being detected, it may be desirable for a monitor and/or a protocol analyzer to test the link and to trigger the protocol analyzer to execute a bit capture upon detecting one or more conditions. In sum, at least one type of network diagnostic function and/or at least one type of network diagnostic module may be associated with an alarm to allow the alarm to help trigger at least one network diagnostic module (which may be of the at least one type) to perform the at least one network diagnostic function.

In one embodiment, the at least one type of network diagnostic function and/or the at least one type of network diagnostic module associated with a particular alarm may be user-specified. Preferably, the at least one type of network diagnostic function and/or the at least one type of network diagnostic module associated with a particular alarm may be user-specified via a software interface or other interface.

As shown in FIG. 6, at the block 72, the pool control module 50 may identify any network diagnostic modules in the pool 30 that are "available" (or, in other words, that are not performing any network diagnostic function in response to a prior alarm). In addition, at the block 72, the pool control module 50 may determine whether there are a sufficient number of available network diagnostic modules that are of the types associated with the current alarm. For example, if the current alarm requires a monitor and a protocol analyzer, the pool control module 50 will determine, at the block 72, whether both a monitor and a protocol analyzer are available. Also, for example, if the current alarm requires a protocol analyzer, the pool control module 50 will determine, at the block 72, whether a protocol analyzer is available.

If, at the block 72, the pool 30 includes a sufficient number of available network diagnostic modules that are of the types associated with the current alarm, the pool control module 50 may proceed to the block 74. Thus, in the example where the current alarm requires a monitor and a protocol analyzer, the pool control module 50 may proceed to the block 74 if both a monitor and a protocol analyzer are available. Also, in the example where the current alarm requires a protocol analyzer, the pool control module 50 may proceed to the block 74 if a protocol analyzer is available. If, at the block 72, the pool 30 does not includes a sufficient number of available network diagnostic modules that are of the types associated with the current alarm, the pool control module 50 may proceed to the block 76. Thus, in the example where the current alarm requires a monitor and a protocol analyzer, the pool control module 50 may proceed to the block 76 if no monitor is available, if no protocol analyzer is available, or if neither a monitor nor a protocol analyzer is available. Also, in the example where the current alarm requires a protocol analyzer, the pool control module 50 may proceed to the block 76 if no protocol analyzer is available.

As shown in FIG. 6, at the block 74, the pool control module 50 may use its switch control module 52 to direct the switch 24 to copy communication to the ports of the available network diagnostic modules found at the block 72. For example, the alarm may have been triggered by a particular link between a pair of ports of the switch 24; and the pool control module 50 may direct the switch 24 to copy communication between that pair of ports to the ports of the available network diagnostic modules. In particular, the statistics that satisfied an alarm's set of conditions (see block 62 in FIG. 6) may have been derived from a particular link between a pair of ports of the switch 24; and the pool control module 50 may direct the switch 24 to copy communication between that pair of ports to the ports of the available network diagnostic modules. In addition, at the block 74, the pool control module 50 may direct those available network diagnostic modules to use the copied communication to perform one or more network diagnostic functions, which network diagnostic functions may be associated with the alarm as discussed above.

As shown in FIG. 6, at the block 76, the pool control module 50 may identify any network diagnostic modules in the pool 30 that have a lower priority than the current alarm. In one embodiment, the person may use a software interface or other interface to rank particular types of alarms in order of priority, thus statically predefining the priorities of the alarms. In this embodiment, the priority of the current alarm may be the pre-defined ranking of its particular alarm type, and the priority of a network diagnostic module may be the pre-defined ranking of an alarm type of an alarm to which the network diagnostic module is responding. It will be understood, however, the priorities of alarms and network diagnostic modules need not be statically defined or based on a single user-specified ranking.

In fact, to determine an alarm's priority, the pool control module 50 is preferably configured to use one or more factors, which may or may not be user-specified. In addition, the pool control module 50 is preferably configured to determine an alarm's priority dynamically and/or to determine a network diagnostic module's priority dynamically. Dynamically determining priorities using one or more suitable factors may help the pool control module 50 to more intelligently prioritize the use of the network diagnostic modules in the pool 30.

As mentioned above, to determine an alarm's priority, the pool control module 50 may use one or more suitable factors. These factors may include, but are not limited to, a user-specified ranking of the type of alarm; the alarm's recurrence, for example, how many times the alarm has previously been triggered and/or the probability that the alarm will continue to be triggered if circumstances related to the alarm are not changed; the amount of monetary expenses, monetary loss and/or other damage that may arise if circumstances related to the alarm are not changed; the alarm's urgency, for example, how soon monetary expenses, monetary loss and/or other damage may arise if circumstances related to the alarm are not changed; the probability that circumstances related to the alarm can be successfully changed; a type of network diagnostic function associated with the alarm; a type of network diagnostic module associated with the alarm; other aspects relating to the alarm; the relative importance of a node whose communication at least partially satisfied the alarm's set of conditions (see block 62 in FIG. 6); a user-specified ranking of a node whose communication at least partially satisfied the alarm's set of conditions; the relative importance of the link via which that conditions-satisfying communication was transmitted; a user-specified ranking of the link via which that conditions-satisfying communication was transmitted; other aspects of the link via which that conditions-satisfying communication was transmitted; one or more other suitable factors, or any combination thereof. In one embodiment, any of these factors may be weighted according to user preference using, for example, a software interface or other interface.

As mentioned above, to determine a network diagnostic module's priority, the pool control module 50 may use one or more suitable factors. Some network diagnostic modules in the pool 30 may be "unavailable" (or, in other words, may be performing at least one network diagnostic function in response to a prior alarm). To determine an unavailable network diagnostic module's priority, the pool control module 50 may use one or more suitable factors, including but not limited to, a user-specified ranking of the alarm type of "the network diagnostic module's alarm" (that is, the alarm to which the network diagnostic module is responding); the network diagnostic module's alarm's recurrence, for example, how many times the alarm has previously been triggered and/or the probability that the alarm will continue to be triggered if circumstances related to the alarm are not changed; the amount of monetary expenses, monetary loss and/or other damage that may arise if circumstances related to the network diagnostic module's alarm are not changed; the network diagnostic module's alarm's urgency, for example, how soon monetary expenses, monetary loss and/or other damage may arise if circumstances related to the alarm are not changed; the probability that circumstances related to the network diagnostic module's alarm can be successfully changed; the type of network diagnostic function being performed by the network diagnostic module; network diagnostic module's type; other aspects relating to the network diagnostic module's alarm; the relative importance of a node whose communication at least partially satisfied the network diagnostic module's alarm's set of conditions (see block 62 in FIG. 6); a user-specified ranking of a node whose communication at least partially satisfied the network diagnostic module's alarm's set of conditions; the relative importance of the link via which that conditions-satisfying communication was transmitted; a user-specified ranking of the link via which that conditions-satisfying communication was transmitted; other aspects of the link via which that conditions-satisfying communication was transmitted; one or more other suitable factors, or any combination thereof. In one embodiment, any of these factors may be weighted according to user preference using, for example, a software interface or other interface. An "available" network diagnostic module (or, in other words, one that is not performing a network diagnostic function in response to a prior alarm) preferably has the lowest priority.

In one embodiment, at the block 76, the pool control module 50 may determine whether there are a sufficient number of network diagnostic modules that have a priority that is not higher than the current alarm (that is, lower than or equal to the priority of the current alarm).

As shown in FIG. 6, at the block 76, the pool control module 50 may determine whether there are a sufficient number of network diagnostic modules that not only have a lower priority than the current alarm (or a priority lower than or equal to the priority of the current alarm), but also are of the types associated with the current alarm. For example, if the current alarm requires a monitor and a protocol analyzer, the pool control module 50 will determine, at the block 76, whether both a monitor and a protocol analyzer have a priority lower than the current alarm. Also, for example, if the current alarm requires a protocol analyzer, the pool control module 50 will determine, at the block 76, whether a protocol analyzer has a priority lower than the current alarm.

If, at the block 76, the pool control module 50 finds that the pool 30 includes a sufficient number of network diagnostic modules that are of the types associated with the current alarm and that have a lower priority than the current alarm (or that have a priority lower than or equal to the priority of the current alarm), the pool control module 50 may proceed to the block 74 to direct the switch 24 to copy communication to the ports of the network diagnostic modules found at the block 76. For example, the alarm may have been triggered by a particular link between a pair of ports of the switch 24; and the pool control module 50 may direct the switch 24 to copy communication between that pair of ports to the ports of the network diagnostic modules found at the block 76. In addition, at the block 74, the pool control module 50 may direct the network diagnostic modules found at the block 76 to use the copied communication to perform one or more network diagnostic functions, which may be associated with the alarm as discussed above.

If, at the block 76, the pool control module 50 finds that the pool 30 does not include a sufficient number of network diagnostic modules that are of the types associated with the current alarm and that have a lower priority than the current alarm (or that have a priority lower than or equal to the priority of the current alarm), the pool control module 50 may proceed to a block 78. At the block 78, the pool control module 50 may simply ignore the current alarm or may queue the alarm for processing later, such as, when one or more higher priority network diagnostic modules change to a lower priority.

Exemplary Multi-Tiered Architecture

Figure 7:
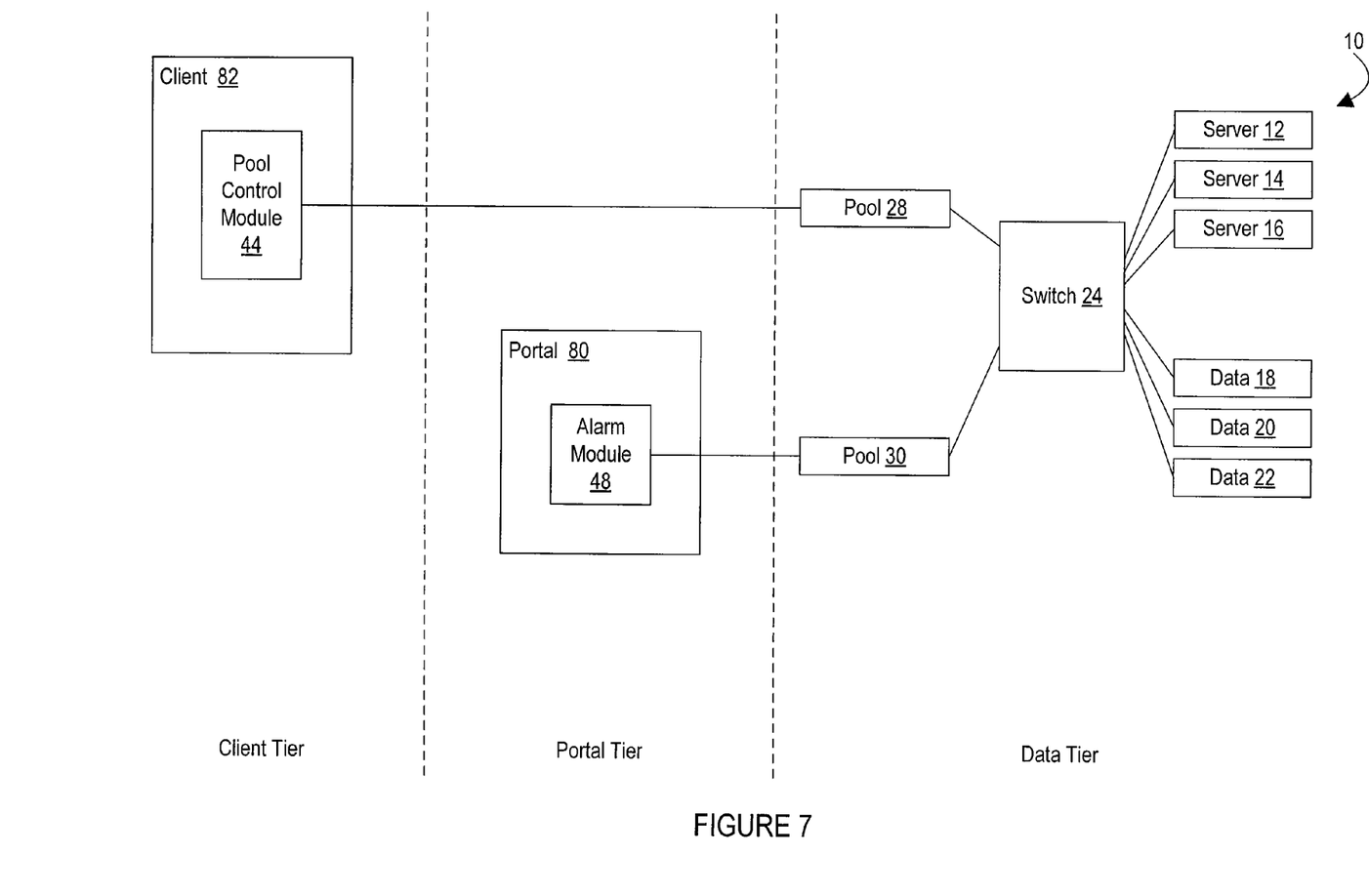
FIG. 7 is a block diagram of another exemplary embodiment of a networking system.

As shown in FIG. 7, aspects of the networking system 10 may be embodied as part of a multi-tiered distributed system. In particular, as shown in FIG. 7, three tiers are referred to as a data source tier, a portal tier and a client tier.

The data source tier may be the functional component that is responsible for actually monitoring the physical data present on a network medium. Preferably, the data source tier is comprised of a plurality of data probes or other monitors, which are connected (either directly or indirectly) to the network. Each of these data probes preferably monitor the physical data present on the network medium and, in a preferred embodiment, generate discrete intervals of data. The probes then analyze these data intervals, and identify specific "attributes" of the network data. These attributes can be certain characteristic or statistic information that relates to the monitored network data. These attributes are generated in the form of "metrics," which are discrete data units. For example, in a SAN environment, each metric is "storage I/O" centric, and contain attributes of multi-interval storage I/O transactions between devices on the network. In addition, they may contain attributes of instantaneous events that may occur on the network. In preferred embodiments, metrics are generated at the data probes in substantially real time; that is, the probes are able to continuously generate metric information about the network traffic as fast as the traffic occurs within the network.

Once metrics are generated at individual data collection probes, they are forwarded to the next tier in the network system—the data portal tier. The portal tier is preferably implemented using a portal 80, which is preferably implemented in software on a host computing device. The portal tier generally provides the function of collection, management and reformatting of the metric data collected from each of the data probes, which are each connected to the portal. In preferred embodiments, the portal tier manages the metric data by encapsulating metric data received from a probe into a data structure referred to as a "data container." This data container has a predefined format, and organizes the metric data in accordance with the type of attributes contained in the metrics.

Once generated at the portal tier, data containers may be requested by the third tier in the network monitoring system—the client tier. The client tier is preferably implemented using a client 82, which is preferably implemented in software on a host computing device. The client tier preferably provides a user interface that can be used by a user to selectively display various types of network information that is derived from the contents of data containers that are received from the portal tier. Preferably, the interface is a graphics-based interface, which allows a variety of graphical views of different network operating characteristics. In one embodiment, the set of alarm conditions associated with a particular alarm may be user-specified via a user interface of the client 82. In one embodiment, the types of network diagnostic functions and/or the types of network diagnostic modules associated with a particular alarm may be user-specified via a user interface of the client 82. In one embodiment, an alarm's priority may be user-specified via a user interface of the client 82.

Other suitable features for networking systems and/or network diagnostic modules are disclosed in U.S. patent application Ser. No. 10/424,367, which was filed Apr. 25, 2003 and entitled A SYSTEM AND METHOD FOR PROVIDING DATA FROM MULTIPLE HETEROGENEOUS NETWORK MONITORING PROBES TO A DISTRIBUTED NETWORK MONITORING SYSTEM; and in U.S. patent application Ser. No. 10/307,272, which was filed Nov. 27, 2002 and entitled SYSTEM AND METHOD FOR NETWORK TRAFFIC AND I/O TRANSACTION MONITORING OF A HIGH SPEED COMMUNICATIONS NETWORK, each of which are hereby incorporated by reference in their entirety.

Other suitable features for networking systems and/or network diagnostic modules are disclosed in "Xgig Analyzer User's Guide Fibre Channel, Gig-E," Release 2.5 (May 3, 2005), which is hereby incorporated by reference in its entirety and which is available from Finisar Corporation, which has offices at 1389 Moffett Park Drive, Sunnyvale, Calif. 94089-1133, USA.

Other suitable features for networking systems and/or network diagnostic modules are disclosed in "NetWisdom 2.1 User's Guide," (September 2005), which is hereby incorporated by reference in its entirety and which is available from Finisar Corporation, which has offices at 1389 Moffett Park Drive, Sunnyvale, Calif. 94089-1133, USA.

Exemplary Architecture

The methods and systems described above can be implemented using software, hardware, or both hardware and software. A module may include the software, the hardware, or both—including software components, object-oriented software components, class components and task components, processes, functions, attributes, procedures, subroutines, segments of program code, drivers, firmware, microcode, circuitry, data, databases, data structures, tables, arrays, variables, field programmable gate arrays (FPGAs), application-specific integrated circuits (ASICs), controllers, computers, and firmware to implement those methods and systems described above. The functionality provided for in the software, hardware, or both may be combined into fewer components or further separated into additional components. Additionally, the components may advantageously be implemented to execute on one or more devices.

Also, one or more software modules, one or more hardware modules, or both may comprise a means for performing some or all of any of the methods described herein. Further, one or more software modules, one or more hardware modules, or both may comprise a means for implementing any other functionality or features described herein.

Embodiments within the scope of the present invention also include computer-readable media for carrying or having computer-executable instructions or data structures stored thereon. Such computer-readable media can be any available media that can be accessed by a computing device. By way of example, and not limitation, such computer-readable media can comprise any storage device or any other medium which can be used to carry or store desired program code means in the form of computer-executable instructions or data structures and which can be accessed by a computing device.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a computing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

The methods and systems described above require no particular component or function. Thus, any described component or function—despite its advantages—is optional. Also, some or all of the described components and functions may be used in connection with any number of other suitable components and functions.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A network diagnostic system comprising a non-transitory computer readable media for carrying or having computer-executable instructions stored thereon configured to providing the following functionality when executed:
   a first control module configurable to trigger the sending of data from a first link of a plurality of links to a first diagnostic module of a first pool of diagnostic modules; to trigger the sending of data from a second link of the plurality of links to the first diagnostic module; to trigger the sending of data from the first link to a second diagnostic module of the pool of diagnostic modules; and to trigger the sending of data from the second link to the second diagnostic module; and
   a second control module configurable to access a second pool of diagnostic modules; to determine the availability of a first diagnostic module of the second pool of diagnostic modules; and to cause the first diagnostic module of the second pool of diagnostic modules, if available, to test the first link in response to first diagnostic module of the first pool detecting a particular condition on the first link such that the first diagnostic module of the first pool of diagnostic modules is able to receive the data from the second link without waiting for the first diagnostic module of the second pool to finish testing the first link; wherein if the first diagnostic module of the second pool of diagnostic modules is not available, the second control module is configurable to determine the availability of a second diagnostic module of the second pool of diagnostic modules from the remaining diagnostic modules of the second pool of diagnostic modules, the second diagnostic module of the second pool of diagnostic modules testing the first link such that the first diagnostic module of the first pool of diagnostic modules is able to receive the data from the second link without waiting for the second diagnostic module of the second pool to finish testing the first link.

2. The network diagnostic system as in claim 1, further comprising the plurality of links.

3. The network diagnostic system as in claim 2, wherein the plurality of links comprise a physical layer switch.

4. The network diagnostic system as in claim 3, wherein the physical layer switch is configured to couple a first network device with a second network device.

5. The network diagnostic system as in claim 1, further comprising the first pool of diagnostic modules.

6. The network diagnostic system as in claim 5, wherein the first pool of diagnostic modules includes a monitor.

7. The network diagnostic system as in claim 5, wherein the first pool of diagnostic modules includes an analyzer.

8. The network diagnostic system as in claim 1, wherein the plurality of links comprise a physical layer switch, the control module being further configured to at least partially automatically direct the physical layer switch to commence copying communication occurring via a first set of one or more of the plurality of links; to automatically at least partially direct the physical layer switch to cease copying the communication occurring via the first set of one or more of the plurality of links; and to automatically at least partially direct the physical layer switch to commence copying communication occurring via a second set of one or more links of the plurality of links.

9. The network diagnostic system as in claim 8, wherein a switch control module integrated as part of the control module is configured to cause the physical layer switch to commence copying and to cease copying at the first set of one or more of the plurality of links and to commence copying at the second set of one or more of the plurality of links.

10. The network diagnostic system as in claim 1, wherein the first control module is further configured to group the plurality of links into two or more groups of links, wherein the two or more groups are comprised of a number of the plurality of links that is less than the total number of the plurality of links.

11. The network diagnostic system as in claim 10, wherein the first control module is further configured to associate the first diagnostic module of the first pool of diagnostic modules with a first group of the plurality of links, and wherein the first diagnostic module associated with the first group is configured to substantially test only the links of the first group.

12. The network diagnostic system as in claim 1, wherein the first control module is further configured to ascertain if a proper authorization key has been entered by a user; to ascertain that identification data corresponding to the plurality of links is within predetermined values; and to enable operation of the triggering upon ascertaining that the authorization key and identification data are proper.

13. The network diagnostic system as in claim 1, further comprising an alarm module configured to receive statistics at least partially generated by the first network diagnostic module of the second pool of diagnostic modules; to determine whether the statistics satisfy a set of conditions associated with a first alarm, the first alarm having a priority; and to compare the priority of the first alarm and a priority of the second network diagnostic module of the second pool of diagnostic modules.

14. The network diagnostic system as in claim 1, wherein the plurality of links comprise a physical layer switch and wherein the first control module is configured to cause the triggering of data on any physical layer switch regardless of type or manufacturer.

15. The network diagnostic system as in claim 1, wherein the plurality of links comprise a plurality of physical layer switches interconnected to function as a single switch.

16. The network diagnostic system as in claim 15, wherein the first pool of diagnostic modules is configured by the first control module to monitor the plurality of physical layer switches interconnected to function as a single switch.

17. The network diagnostic system as in claim 1, wherein the network diagnostic system is associated with a Storage Area Network (SAN).

18. The network diagnostic system as in claim 1, wherein the network diagnostic system utilizes an optical communication medium.

19. The network diagnostic system as in claim 1, wherein the network diagnostic system utilizes an electrical communication medium.

20. A network diagnostic system implemented in hardware comprising:
a first control module configurable to trigger the sending of data from a first link of a plurality of links to a first diagnostic module of a first pool of diagnostic modules; to trigger the sending of data from a second link of the plurality of links to the first diagnostic module; to trigger the sending of data from the first link to a second diagnostic module of the pool of diagnostic modules; and to trigger the sending of data from the second link to the second diagnostic module; and
a second control module configurable to access a second pool of diagnostic modules; to determine the availability of a first diagnostic module of the second pool of diagnostic modules; and to cause the first diagnostic module of the second pool of diagnostic modules, if available, to test the first link in response to first diagnostic module of the first pool detecting a particular condition on the first link such that the first diagnostic module of the first pool of diagnostic modules is able to receive the data from the second link without waiting for the first diagnostic module of the second pool to finish testing the first link; wherein if the first diagnostic module of the second pool of diagnostic modules is not available, the second control module is configurable to determine the availability of a second diagnostic module of the second pool of diagnostic modules from the remaining diagnostic modules of the second pool of diagnostic modules, the second diagnostic module of the second pool of diagnostic modules testing the first link such that the first diagnostic module of the first pool of diagnostic modules is able to receive the data from the second link without waiting for the second diagnostic module of the second pool to finish testing the first link.

* * * * *